(12) United States Patent
Avner et al.

(10) Patent No.: US 10,742,449 B1
(45) Date of Patent: Aug. 11, 2020

(54) REAL TIME ANALOG FRONT END RESPONSE ESTIMATION FOR SENSING APPLICATIONS

(71) Applicant: Apple Inc., Cupertino, CA (US)

(72) Inventors: Yuval Avner, Haifa (IL); Michael Kerner, Tel Mond (IL); Ran Forte, Moshav bnei Dror (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/438,527

(22) Filed: Jun. 12, 2019

(51) Int. Cl.
  *H04L 25/02* (2006.01)
(52) U.S. Cl.
  CPC .......... *H04L 25/021* (2013.01); *H04L 25/024* (2013.01); *H04L 25/0222* (2013.01); *H04L 25/0228* (2013.01)
(58) Field of Classification Search
  CPC ............. H04L 25/0204; H04L 25/0212; H04L 25/0202; H04L 25/0222; H04L 25/024
  USPC .................................. 375/267, 299, 347–349
  See application file for complete search history.

(56) References Cited

U.S. PATENT DOCUMENTS

| | | | |
|---|---|---|---|
| 6,614,834 B1 | 9/2003 | Meng | |
| 7,388,541 B1 | 6/2008 | Yang | |
| 7,418,240 B2 | 8/2008 | Hsu | |
| 7,561,048 B2 | 7/2009 | Yushkov | |
| 8,090,057 B2 | 1/2012 | Min | |
| 8,982,803 B1* | 3/2015 | Zhang | H04L 25/0204 370/329 |
| 9,046,591 B1 | 6/2015 | Yang | |
| 9,857,476 B2 | 1/2018 | Mathews | |
| 2007/0167671 A1* | 7/2007 | Miller, III | H04R 25/606 600/25 |
| 2009/0258607 A1* | 10/2009 | Beninghaus | H04B 1/3805 455/77 |
| 2015/0236770 A1* | 8/2015 | Garrett | H04B 7/0452 370/329 |
| 2018/0115439 A1* | 4/2018 | Bhatti | H04B 17/364 |
| 2018/0242107 A1* | 8/2018 | Sen | G01S 5/0294 |
| 2019/0074973 A1 | 3/2019 | Hadaschik | |
| 2019/0154439 A1 | 5/2019 | Binder | |
| 2019/0271775 A1* | 9/2019 | Zhang | H04W 52/0225 |
| 2019/0274112 A1* | 9/2019 | Kleinbeck | H04B 17/29 |
| 2019/0293780 A1* | 9/2019 | Li | G01S 13/765 |
| 2019/0305813 A1* | 10/2019 | Zhang | H04B 1/44 |

* cited by examiner

*Primary Examiner* — Emmanuel Bayard
(74) *Attorney, Agent, or Firm* — Kowert, Hood, Munyon, Rankin & Goetzel, P.C.

(57) ABSTRACT

Embodiments are presented herein of apparatuses, systems, and methods for a wireless device to perform improved channel estimates for sensing applications such as ranging. The wireless device may determine noise characteristics, e.g., a spectrum of the variance of noise on a channel and may use the noise characteristics to estimate a response of an analog front end of the wireless device. The wireless device may correct a channel estimate based on the estimated response of the analog front end.

20 Claims, 8 Drawing Sheets

REAL TIME ANALOG FRONT END RESPONSE ESTIMATION FOR SENSING APPLICATIONS

TECHNICAL FIELD

The present application relates to wireless devices, and more particularly to apparatuses, systems, and methods for channel estimation for sensing applications.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

One use case for wireless communication includes sensing applications, e.g., estimating the distance or angle between multiple devices. For example, ranging can provide the distance between one wireless device and another. However, existing wireless communication technologies may suffer from poor performance. Accordingly, improvements in the field are desired.

SUMMARY

Embodiments are presented herein of, inter alia, systems, apparatuses, and methods for wireless devices performing sensing with improved channel estimation, for example in a ranging (time of flight) application.

According to the techniques described herein, a first wireless device may begin a sensing process with a second wireless device. The first wireless device may receive channel estimation sequences and/or other data from the second device for use in the sensing process. The first wireless device may estimate the channel, excluding the channel response of the analog front end (AFE) of the first wireless device. For example, the first wireless device may determine an estimate of the AFE response based on an estimate of variance of thermal noise and may use the estimated AFE response to correct an estimate of the overall channel.

The techniques described herein may be implemented in and/or used with a number of different types of devices, including but not limited to cellular phones, tablet computers, accessory and/or wearable computing devices, portable media players, vehicles, access points and other wireless local area network equipment, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
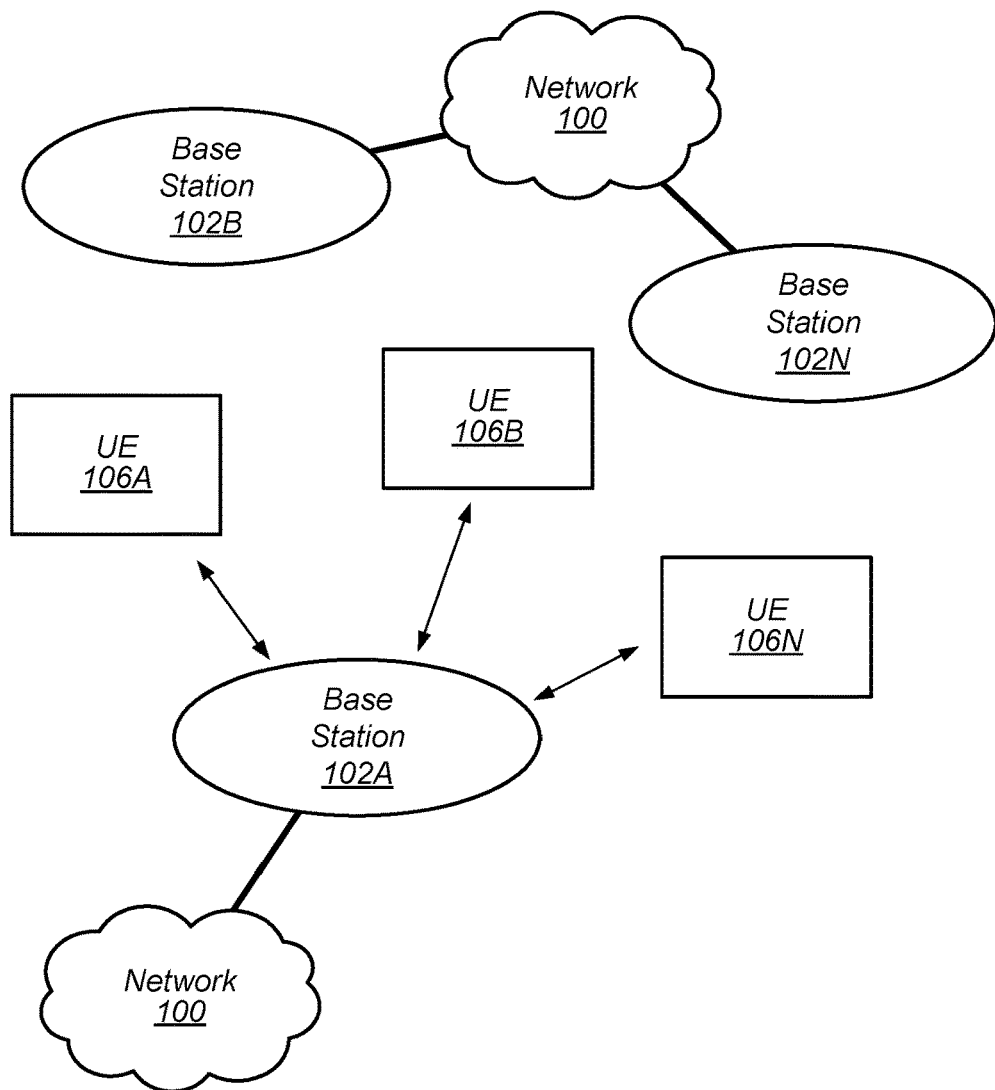
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device. A communication device may be referred to as a station or STA.

Base Station or Access Point (AP)—The term "Base Station" has the full breadth of its ordinary meaning, and at least includes a wireless communication station installed at a fixed location and used to communicate as part of a wireless telephone system or radio system. The term "access point" is used similarly.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network. Wi-Fi or WLAN may refer to technology based on IEEE 802.11 wireless standards such as 802.11a, 802.11.b, 802.11g, 802.11n, 802.11-2012, 802.11ac, 802.11ad, 802.11.ax, 802.11ay, 802.11az, and/or other IEEE 802.11 standards.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
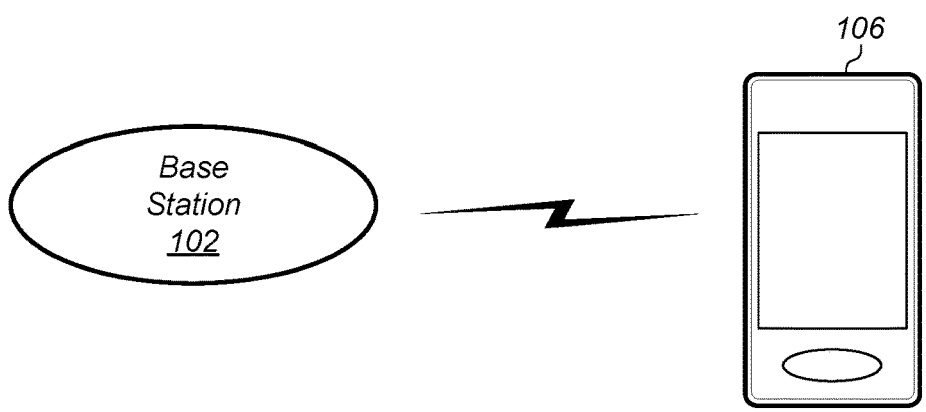
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes one or more base stations 102, such as base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, traces, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
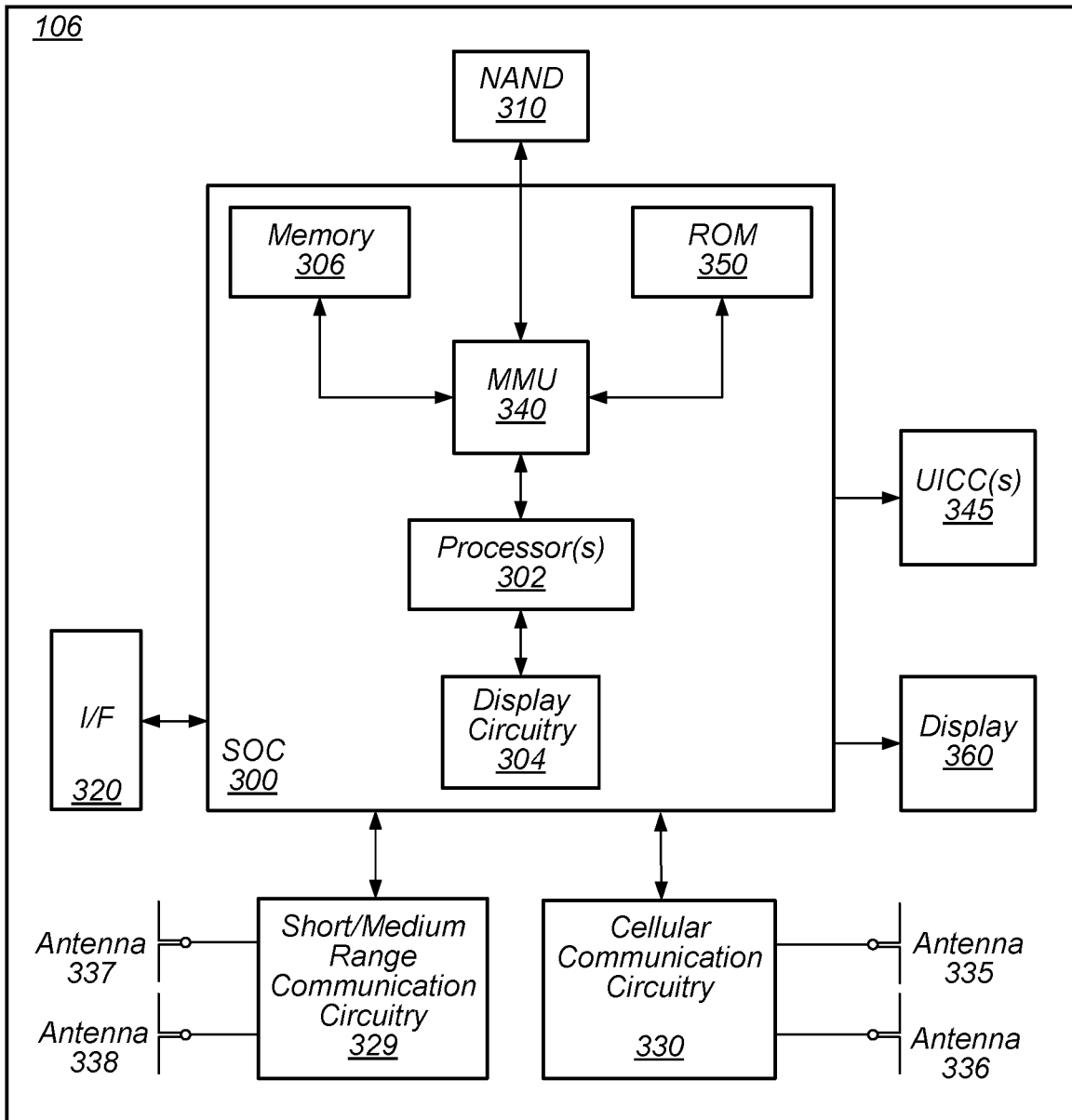
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains for multiple RATs (e.g., a first receive chain for LTE and a second receive chain for 5G NR). Such receive chains may include and/or be communicatively coupled (e.g., directly or indirectly) to dedicated processors and/or radios. In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements/processors may be included in cellular communication circuitry 330 and, similarly, one or more processing elements/processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
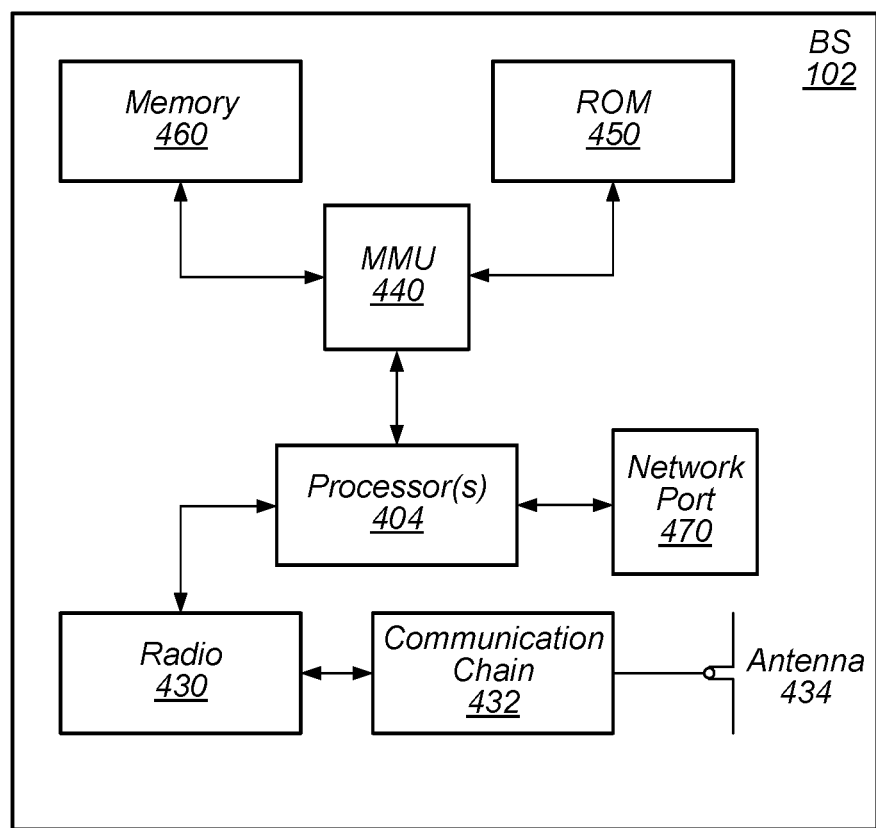
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
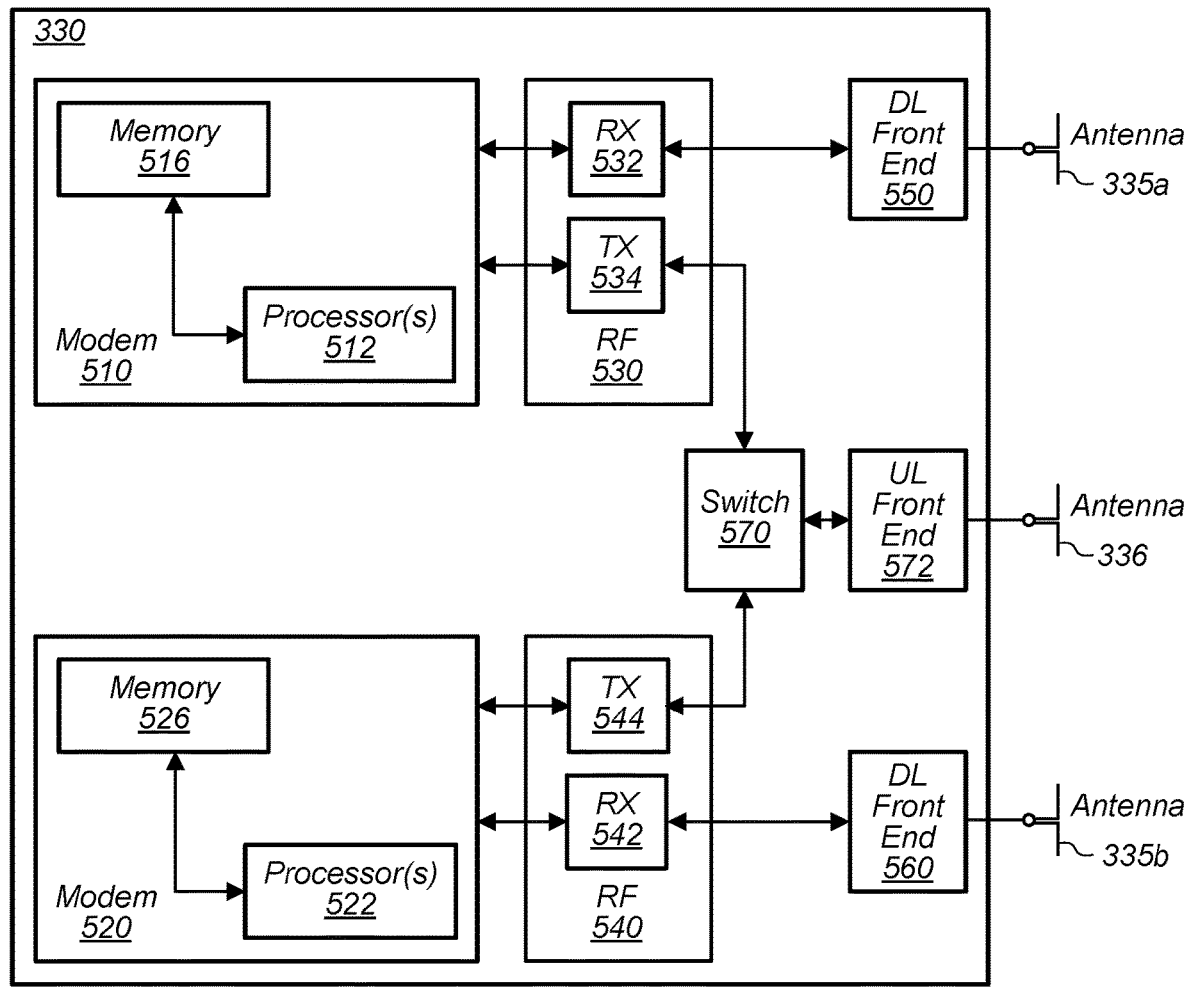
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains for multiple RATs (e.g., a first receive chain for LTE and a second receive chain for 5G NR). Such receive chains may include and/or be communicatively coupled (e.g., directly or indirectly) to dedicated processors and/or radios. For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
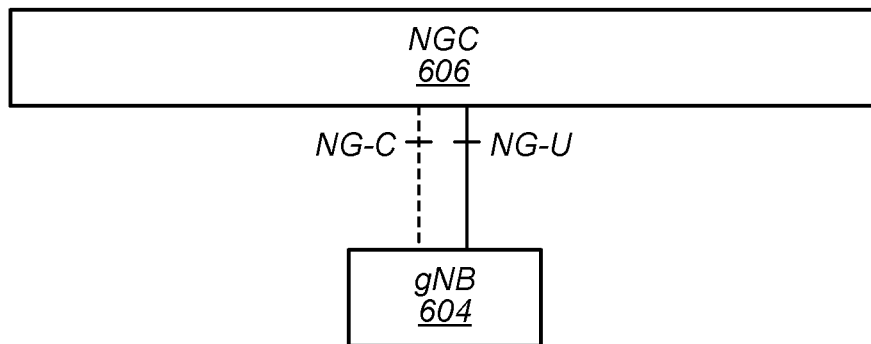
FIGS. 6 and 7 illustrate examples of a 5G NR base station (gNB), according to some embodiments.
Figure 7:
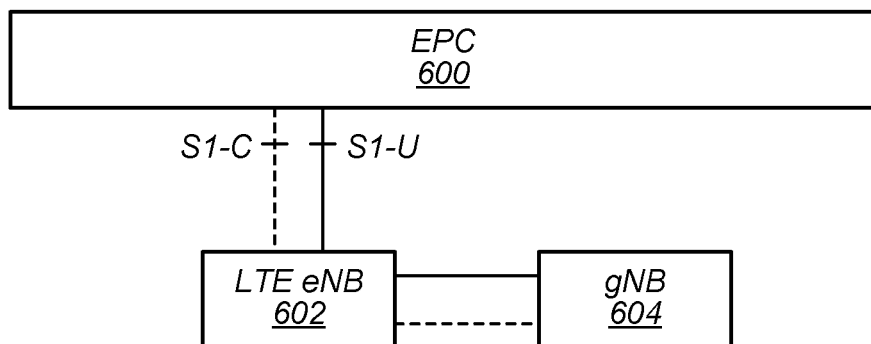

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
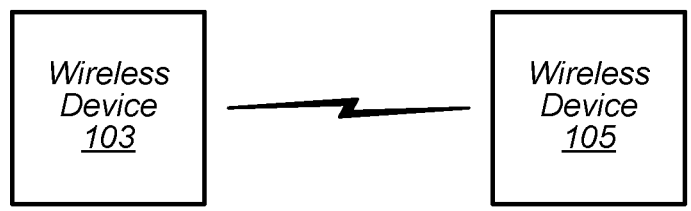
FIG. 8 illustrates two wireless devices performing a sensing application, according to some embodiments.

FIG. 8—Sensing Applications

FIG. 8 illustrates an exemplary (and simplified) wireless communication system in which aspects of this disclosure may be implemented. It is noted that the system of FIG. 8 is merely one example of a possible system, and embodiments of this disclosure may be implemented in any of various systems, as desired.

As shown, the exemplary wireless communication system includes a ("first") wireless device 103 in communication with another ("second") wireless device. The first wireless device 103 and the second wireless device 105 may communicate wirelessly using any of a variety of wireless communication techniques, potentially including ranging wireless communication techniques.

As one possibility, the first wireless device 103 and the second wireless device 105 may perform ranging or other sensing techniques using wireless local area networking (WLAN) communication technology (e.g., IEEE 802.11/ Wi-Fi based communication) and/or techniques based on WLAN wireless communication. One or both of the wireless device 103 and the wireless device 105 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc. The ranging (or other sensing techniques) described herein may be performed using WLAN or various other wireless technologies, including BT, BLE, NFC, or cellular, etc.

The wireless devices 103 and 105 may be any of a variety of types of wireless device. As one possibility, one or more of the wireless devices 103 and/or 105 may be a substantially portable wireless user equipment (UE) device, such as a smart phone, hand-held device, a wearable device such as a smart watch, a tablet, a motor vehicle, or virtually any type of wireless device. As another possibility, one or more of the wireless devices 103 and/or 105 may be a substantially stationary device, such as a set top box, media player (e.g., an audio or audiovisual device such as a television), gaming console, desktop computer, appliance, door, access point, base station, or any of a variety of other types of device. For example, the wireless devices 103 and 105 may be any of the devices illustrated in and described with respect to the FIGS. 1-7, among various possibilities. The ranging (or other sensing techniques) may be peer-to-peer (P2P). For example, P2P ranging may be performed between a television and a smart phone, or between two phones, among various possibilities.

Each of the wireless devices 103 and 105 may include wireless communication circuitry configured to facilitate the performance of wireless communication, which may include various digital and/or analog radio frequency (RF) components, a processor (such as, e.g., processor(s) 302, 404, 512, 522, baseband processor(s), processor(s) associated with communication circuitry, etc., among various possibilities) that is configured to execute program instructions stored in memory, a programmable hardware element such as a field-programmable gate array (FPGA), and/or any of various other components. The wireless device 103 and/or the wireless device 105 may perform any of the method embodiments described herein, or any portion of any of the method embodiments described herein, using any or all of such components. For example, the wireless device 103 and/or the wireless device 105 may include one or more processors or processing elements that may be configured to cause the wireless device to cause the device to perform any of the method embodiments described herein, or any portion of any of the method embodiments described herein, using any or all of such components.

Each of the wireless devices 103 and 105 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include or be coupled to a single antenna or multiple antennas (e.g., for multiple-input and multiple-output (MIMO)) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using one or more of LTE, CDMA2000 1×RTT, GSM, and/or 5G NR, and separate radios for communicating using each of Wi-Fi and Bluetooth. Other configurations are also possible.

As previously noted, aspects of this disclosure may be implemented in conjunction with the wireless communication system of FIG. 1. For example, the wireless devices 103 and/or 105 may perform one or more ranging wireless communication techniques or features described subsequently herein with respect to the Figures. By utilizing such techniques (and/or other techniques described herein), the wireless device(s) may (at least according to some embodiments) be able to achieve secure ranging communication with improved performance relative to previous techniques. The wireless devices 103 and/or 105 may be referred to as STAs.

Wireless sensing techniques may be used to determine the distance and/or direction from one device to another. In other words, wireless sensing may be used to determine relative position of wireless devices (e.g., wireless devices 103 and 105).

For example, two wireless devices (e.g., wireless devices 103 and 105) may engage in a ranging operation so that at least one of the wireless devices will be able to determine or estimate the range (e.g., distance) between the two devices, e.g., by measuring the amount of time that it takes to send messages between the devices. For example, the Fine Timing Measurement (FTM) protocol specified in 802.11-2016 may provide a time-of-flight (ToF) based mechanism to perform ranging between two 802.11/WiFi devices, according to some embodiments. In FTM, range may be determined as a function of several time instances (t1, t2, t3 and t4), where t1, t2, t3, and t4 correspond to the time of departure and time of arrival of measurement frames sent in both directions (e.g., uplink and downlink or from a first device to a second device and vice versa) between the two devices (e.g., the two STAs). For example, t1 may be the departure time from a first device, t2 may be the arrival at the second device, t3 may be the departure from the second device and t4 may be the arrival at the first device. Thus, t3−t2 may correspond to the processing time of the second device, t2−t1 may correspond to the one-way travel time from the first to the second device, and t4−t3 may be the one way travel time from the second device to the first. Thus, the round-trip time of flight may be calculated as (t4−t1)−(t3−t2), in other words total time less processing time. Standards under development (e.g., 802.11az) may aim to improve and/or optimize the ranging protocols for a variety of use cases, including very high throughput (VHT), high efficiency (HE), and/or 60 GHz (e.g., millimeter wave or mmWave) communications, among others. Further, improvements to scalability and security may be desired.

In some embodiments, the ranging protocol (e.g., within 802.11az) may include a common negotiation phase that may precede a ranging measurement phase of various ranging modes and/or packet sequences (e.g., FTM, High efficiency ranging for 802.11az (HEz), or VHT ranging for 802.11az (VHTz); it should be noted that these may be working names for various ranging modes, that these names may change, and that other ranging modes may be used). In the negotiation phase, an initiating STA (iSTA) may send an initial measurement request frame (e.g., an FTM measurement request frame, e.g., a negotiation frame). The measurement request frame may include a set of ranging parameters. For example, the measurement request frame may include scheduling parameters in one or more FTM parameters element or a set of range measurement parameter elements in a next generation positioning (NGP) parameters element, etc. The ranging parameters may describe the bandwidth or bandwidths available for ranging, the bandwidth measured by the iSTA, radio frequency (RF) related parameters, one or more modes of ranging supported by the iSTA, and/or ranging security requirements, among other possibilities. The frame contents may describe the iSTA's capability and availability for ranging measurement exchange. Among various possibilities, the frame may describe whether the iSTA supports secure ToF (SToF) measurement. SToF may be a new sensor feature for measuring the distance between two devices in a secure way. The SToF feature may be relevant to the 802.11az standard, which is still under development by IEEE.

A responding STA (rSTA) may indicate various ranging parameters in response to the initial measurement request frame from the iSTA. For example, the rSTA may indicate whether it supports SToF. The rSTA may send an acknowledgement (ACK) for the measurement request frame. The rSTA may also send a response frame (e.g., a first FTM measurement frame). In some embodiments, the measurement frame may be sent within milliseconds, e.g., 10 ms, of receiving the initial measurement request frame. Note that other response times or time delays are possible (e.g., 5 ms, 15 ms, tens of milliseconds, hundreds of milliseconds, etc.).

A sensing application to determine the direction from one device to another may operate in a similar manner. For example, a first device may transmit a series of measurement frames over time, e.g., transmitting the frames in different directions at different times. A responding, second device may respond to one or more of the measurement frames, e.g., indicating which of the measurement frames was received with the best strength (or other measurement). Thus, the first and/or second device may determine the direction based on which of the measurement frames was received with the best measurement by the receiving device.

Figure 9:
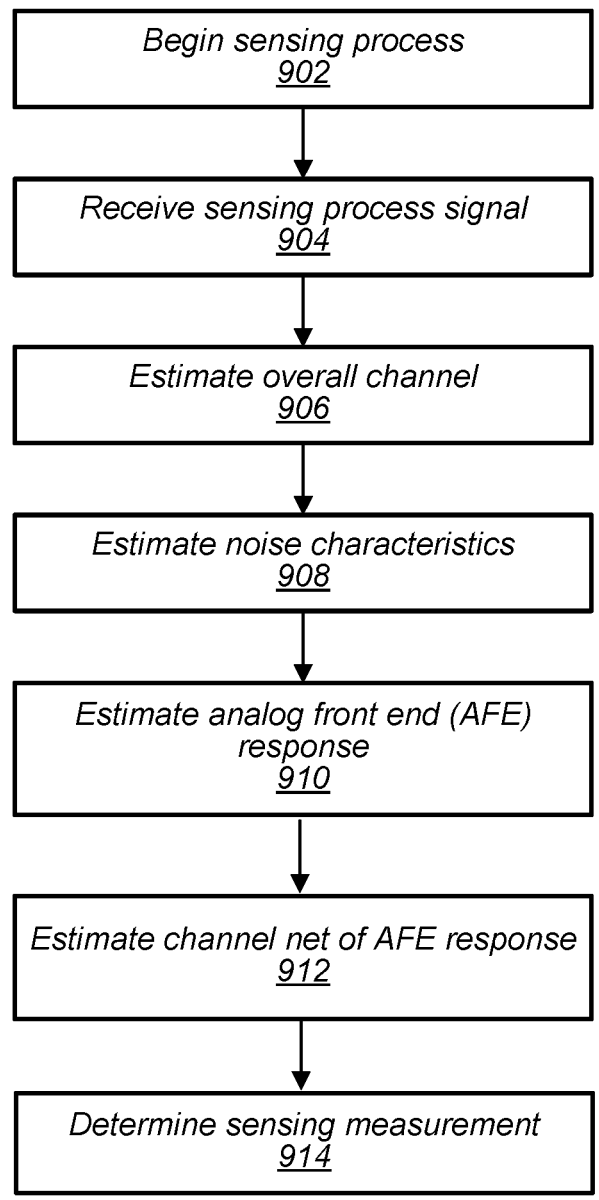
FIG. 9 is a flow chart diagram illustrating an example method for performing real time analog frond end response estimation, according to some embodiments.
Figure 10:
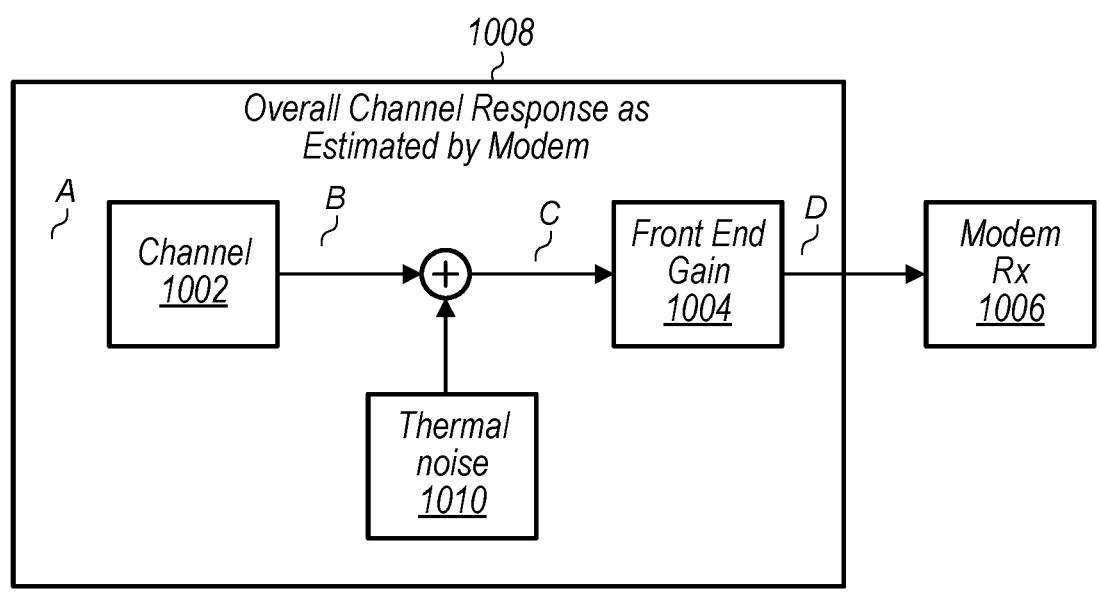
FIG. 10 illustrates an example block diagram of a wireless device estimating a channel, according to some embodiments.

FIGS. 9 and 10—Real Time Analog Front End (AFE) Response Estimation for Sensing Applications Estimating a channel may be an important aspect of sensing applications. For example, a precise channel estimation may be beneficial for precisely and/or accurately determining the arrival time of a known sequence (e.g., a training sequence) at a receiving wireless device. Arrival time may be used to estimate the range or distance between two devices. In some systems, particularly with wide-band channels, the channel response of an analog front end (AFE) of a receiving wireless device may be a significant source of error for channel estimation and sensing applications. The AFE may refer to the circuitry between one or more antennas and one or more analog to digital converters (ADCs) or modems. The one or more antennas may be considered as a component of the AFE. For example, an AFE may include any number of antennas, amplifiers, phase shifters, band pass filters, low pass filters, mixers, traces, etc. For example, the AFE may be a component or subset of short range wireless communication circuitry 329 and/or cellular communication circuitry 330. Similarly, an AFE may be or include a chip (or chips) configured to convert between radio frequency (RF) signals and intermediate frequency (IF) signals and/or baseband (BB) signals.

AFE response may vary significantly at different frequencies (e.g., the response may not be flat over the bandwidth of a channel, particularly for channels with larger bandwidth). Accordingly, the AFE response may be a significant source of error in channel estimation and sensing applications, according to some embodiments. AFE response may be a larger source of error for channels with larger bandwidth. For example, AFE response may vary over the bandwidth of channels of various wireless technologies, including: 802.11ad/ay with 2-4 GHz channels, ultra-wideband (UWB) communications with 0.5-1 GHz channels, and 802.11ac/ax with 80-160 MHz channels, among various possibilities.

In some embodiments, it may be possible to correct for AFE response by using loopback techniques. Generally, such loopback may be included in systems with small numbers of antennas (e.g., approximately up to 3, for example) and in which transmission (Tx) and reception (Rx) chains may be connected. However, in other embodiments loopback may not be practical or may not be desirable in view of other design features of a wireless device. For example, loopback for large number of antennas possibly sharing some circuitry (e.g., cables, etc.) may prevent or deter loopback. In other words, some AFE circuitry may not be configured for loopback.

The impact of gain flatness in-side RF channel may have a small impact on the modem performance, e.g., because the modem estimates the overall channel response that includes the physical channel and AFE response. In other words, the modem may equalize the overall response.

However, in sensing applications such as ranging (e.g., Time of Flight (ToF)), it may be beneficial to de-embed the AFE response in order to estimate the channel response of the physical channel only. In other words, improved ToF accuracy may be achieved by isolating the channel response of the physical channel from the response of the AFE. For example, in non-line of sight (NLOS) measurement, a ToF error of approximately 2 ns may result from the actual channel response of some AFEs relative to a perfectly flat AFE response. Such an error may be very large in the context of some systems, e.g., which may require ToF to be accurate with a tolerance on the order of tens of picoseconds (ps).

Accordingly, improved methods for channel estimation may be desired. FIG. 9 illustrates exemplary techniques for performing channel estimation with a compensation for AFE response. Aspects of the method of FIG. 9 may be implemented by a wireless device, such as the wireless devices 103 and 105 as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) (e.g., processor(s) 302, 404, 512, 522, baseband processor(s), processor(s) associated with communication circuitry, etc., among various possibilities) may cause a wireless device to perform some or all of the illustrated method elements. Note that while at least some elements of the method are described in a manner relating to the use of communication techniques and/or features associated with 802.11 specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A wireless device 103 (e.g., a wireless device of any type) may begin a sensing process with a second wireless device 105 (e.g., a wireless device of any type) (902), according to some embodiments.

The sensing process may be a distance or ranging measurement process, e.g., using ToF. In some embodiments, the sensing process may be an angle/direction estimate, e.g., using angle of arrival.

Either of the devices may initiate the sensing process. For example, the wireless device 103 may be an initiating device (iSTA) or responding device (rSTA).

The devices may negotiate various sensing parameters (e.g., time and frequency resources to use for ranging). The devices may indicate that they support secure ToF (SToF) ranging, and may negotiate to use SToF. Such negotiation and indication may be performed by including various parameters or indicators in fields of one or more initial messages, such as a fine timing measurement (FTM) measurement request frame (or frames) and/or other negotiation frames, among various possibilities.

The devices may negotiate the channel estimation sequences (e.g., known sequences, training sequences) to use for the sensing process. For example, the devices 103 and 105 may determine a key for generating known sequences.

In some embodiments, the wireless devices 103 and 105 may negotiate the use of data aided channel estimation for the sensing process. In other words, the wireless devices 103 and 105 may agree to use other data (e.g., application data) instead of or in addition to channel estimation sequences for channel estimation and/or sensing.

The wireless devices 103 and 105 may negotiate structure of a sensing process signal. For example, the wireless devices 103 and 105 may negotiate a number of channel estimation sequences, information (e.g., a key) used to generate those sequences, and possibly an amount of data to use for channel estimation and the sensing process. Larger numbers of sequences may provide increased processing gain. In other words, the processing gain may be directly proportional to the number of sequences used to estimate the channel and/or perform the sensing (e.g., ToF) measurement. Accordingly, a larger number of sequences may be used to achieve more accurate channel estimates and more accurate sensing estimates.

The negotiations may be performed using WLAN and/or another RAT (e.g., BT, BLE, cellular, NFC, etc.), as desired.

The wireless device 103 may receive a sensing process signal transmitted by wireless device 105 (904), according to some embodiments. The signal may include one or more channel estimation sequences and/or other data configured for channel estimation. The signal may be received over a wireless channel, e.g., using one or more antennas coupled to an AFE. The channel estimation sequences may include known sequences, e.g., as negotiated in 902. In some embodiments, application data may also be received. The sensing process signal may be a WLAN transmission and/or may be a transmission according to another RAT (e.g., BT, BLE, cellular, NFC, etc.), as desired.

The sensing process signal may be or include a ranging process signal and/or a angle estimation process signal, among various possibilities.

Based on the received signal, the wireless device 103 may estimate the overall channel response (e.g., including the physical channel and the AFE response) (906), according to some embodiments.

Referring to FIG. 10, which illustrates an exemplary receiver estimating channel response, the overall channel response 1008 may include: the physical (e.g., wireless, cascade) channel response 1002, thermal noise 1010, and the front-end gain (e.g., AFE response) 1004. In other words, the overall channel response may include points A-D, as illustrated in FIG. 10. Point A represents the initially transmitted signal. Point B represents the signal after the wireless channel 1002. Point C illustrates the signal after the addition of thermal noise (e.g., additive white Gaussian noise (AWGN)) 1010. Point D represents the signal after the AFE response 1004, e.g., as received by modem 1006. The overall channel response may be estimated by the modem 1006, among various possibilities.

Equation 1 illustrates a mathematical representation of the signal received by the wireless device 103, e.g., at point D in FIG. 10, according to some embodiments.

$$y_n = (h \cdot s_n + v_n) \cdot g = h \cdot s_n \cdot g + v_n \cdot g \quad \text{Equation 1}$$

The term $y_n$ represents the received signal for a single channel subcarrier at time or symbol n (e.g., for an nth symbol of the received signal, e.g., of the channel estimation sequence(s)). In other words, $y_n$ represents the signal or symbol received by the modem 1006 at time or symbol n. The term h represents the channel response (e.g., of the wireless channel 1002). The term $s_n$ represents the known or expected signal at time n. Note that $s_n$ may equal any non-zero complex number. The term $v_n$ represents the thermal noise (e.g., AWGN) 1010 at time n. Note that AWGN averages to zero, so the standard deviation, represented by σ may be used in subsequent equations. The term g represents the complex value of AFE response 1004. Thus, as shown, the AFE may separately impact the estimate of the received signal in relation to the channel and the noise.

Referring back to FIG. 9, in order to determine the overall channel response, the wireless device 103 may compare the received sequences with the known or expected channel estimation sequences. The overall channel (e.g., A to D, e.g., the concatenation hg) may be estimated according to Equation 2, e.g., by comparing the received signal to a corresponding known or expected signal over a period of time (e.g., over a number of symbols). As shown, the concatenation of the channel response, h, and AFE response, g, may be equal to the ratio of $y_n$ to $s_n$, averaged over N symbols (e.g., or over N units of time), according to some embodiments.

$$\widehat{hg} = \frac{1}{N} \sum_{n=1}^{N} \frac{y_n}{s_n} \quad \text{Equation 2}$$

In some embodiments, received application data may also be used to estimate the overall channel response. In other words, the wireless device 103 may use received application data to perform a data aided channel estimation.

Referring back to FIG. 9, the wireless device 103 may estimate the thermal noise characteristics of the channel (908), according to some embodiments. For example, the wireless device 103 may estimate the standard deviation or variance (e.g., square of standard deviation) of the noise. Referring again to FIG. 10, note that the thermal noise 1010 may not pass through the entire channel (e.g., A-D). In contrast, the thermal noise only passes through the AFE, e.g., (C-D). The wireless device 103 may perform an estimate of variance of noise based on the received sequences and/or other received data.

The wireless device 103 may estimate the spectrum of the variance of noise. For example, the wireless device may determine the level of variance of noise as a function of frequency.

In some embodiments, the modem 1006 may routinely (e.g., periodically, iteratively, or continuously) estimate variance of noise. For example, the modem may estimate variance of noise using ongoing or periodic measurements. For example, the modem may estimate noise variance in order to determine various metrics such as signal-to-noise ratio (SNR), etc. Thus, determining the variance of noise may be based on a most current estimate of the routine noise estimation. For example, a recent rolling average value or similar value may be used at a specific time associated with the channel estimate (e.g., at approximately the time of the sensing process signal).

In some embodiments, the modem 1006 may generate an estimate of noise for the sensing process. For example, an estimate of variance of noise (e.g., using potentially customized estimation characteristics or techniques) may be determined for the purpose of performing a channel estimate and an accurate sensing (e.g., ToF) measurement.

The wireless device 103 may estimate the AFE response (910), according to some embodiments. For example, the wireless device 103 may estimate the absolute value of the AFE gain response which may include the response of one or more antennas and other circuitry such as amplifiers (e.g., low noise amplifiers, etc.), mixers, traces, filters (e.g., low pass filters, band pass filters, high pass filters, etc.). Note that any or all of these exemplary components may or may not be included in the AFE. Additional or different components may be included. In other words, the wireless device 103 may estimate the impact on the signal of AFE gain 1004, e.g., the difference in the signal at point D relative to point C.

In some embodiments, the absolute value of AFE gain (e.g., amplified by the noise, e.g., comparing points B and D of FIG. 10) may be estimated as illustrated in Equations 3 and 4.

$$\widehat{\sigma^2 \cdot g^2} = \frac{1}{N-1} \sum_{n=1}^{N} \left( \frac{y_n}{s_n} - \widehat{hg} \right)^2 \quad \text{Equation 3}$$

As shown in Equation 3, the concatenation of the variance of the noise (e.g., $\sigma^2$) and the absolute value of AFE gain (e.g., $g^2$), may be equal to the average of the square of the ratio of $y_n$ to $s_n$ less the concatenation of the estimated channel response and AFE response. Note that the illustrated denominator (e.g., N-1) is exemplary only and that other denominators may be used, e.g., consistent with statistical theory and design for unbiased estimation of standard deviation and variance. Thus, the absolute value of AFE gain may be calculated by the dividing the above value (e.g., concatenation of $\sigma^2$ and $g^2$) by the noise variance and taking the square root. In other words, the concatenation of the estimated channel response and AFE response may be subtracted from the received sample, normalized by a corresponding known symbol or known sample. In other words, Equation 3 may be solved for the absolute value of AFE response, absolute value of g.

$$|g| = \sqrt{\frac{\widehat{\sigma^2 \cdot g^2}}{\widehat{\sigma^2}}} = \sqrt{\frac{\frac{1}{N-1}\sum_{n=1}^{N}\left(\frac{y_n}{s_n} - \frac{1}{N}\sum_{n=1}^{N}\frac{y_n}{s_n}\right)^2}{\widehat{\sigma^2}}}$$ Equation 4

Equation 4 illustrates the solution of Equation 3, according to some embodiments.

In some embodiments, the wireless device 103 may routinely (e.g., periodically, iteratively, or continuously) estimate the AFE response. For example, the wireless device 103 may estimate AFE using ongoing or periodic measurements of noise. Thus, determining the AFE may be based on a most current estimate of the routine noise estimation. For example, a recent rolling average value or similar value of noise may be used at a specific time associated with the channel estimate (e.g., at approximately the time of the sensing process signal) to estimate the current or most up-to-date AFE.

In some embodiments, the wireless device 103 may generate an estimate of AFE for the sensing process. For example, an estimate of AFE may be determined for the purpose of performing a channel estimate and an accurate sensing (e.g., ToF) measurement. Such an AFE estimate may be based on a noise estimate associated with the time of the sensing process signal.

Referring back to FIG. 9, the wireless device 103 may estimate the channel net of the AFE response (912), according to some embodiments. In other words, the wireless device 103 may determine the approximate channel response excluding the response of the AFE, e.g., the channel response prior to the AFE. In terms of FIG. 10, the wireless device 103 may determine the channel response of the wireless channel 1002, e.g., the difference between point A and point B. For example, the wireless device 103 may subtract the response of the AFE estimated in 910 from the response of the overall channel estimated in 906. Thus, the wireless device 103 may determine a channel estimate that is compensated for (e.g., corrected for) the estimated AFE response.

In other words, the wireless device 103 may use the correction for AFE response to equalize the channel response over the bandwidth of the channel (e.g., potentially 2-4 GHz, and potentially including many (e.g., hundreds, among various possibilities) of subcarriers). For example, such equalization may lead to a significant decrease in ripple, e.g., on the order of a five-fold reduction in ripple, among various possibilities.

In some embodiments, the wireless device 103 may use a larger number of channel estimation sequences (and/or other data) in order to achieve a desired level of processing gain. For example, if a more accurate channel estimation is desired, the wireless device 103 may use a larger number of sequences for time and/or frequency domain averaging. In other words, the wireless device 103 may perform coherent summation of the number of sequences for channel estimation purposes in order to estimate the channel with the desired precision. It will be appreciated that the desired number of sequences (and/or other data) may be used to estimate the overall channel, noise, AFE response, and/or channel response net of AFE. The wireless device 103 may select a number of channel estimation sequences (and/or amount of other data) in order to achieve a desired level of reduction in ripple (e.g., or more generally, improvement of the channel estimate).

The wireless device 103 may perform a sensing measurement (914), according to some embodiments. For example, the wireless device 103 may use the channel estimate, excluding the AFE channel response, to determine a ToF and a corresponding distance to wireless device 105, among various possibilities. In other words, the wireless device 103 may compensate the overall channel estimate based on the estimate of the AFE response to perform a sensing measurement with improved accuracy (e.g., relative to a sensing measurement without compensation for the AFE). For example, based on the compensated channel estimate, the wireless device 103 may determine a time of arrival of the sensing process signal. The wireless device 103 may use the time of arrival of the sensing process signal to determine ToF of the sensing process signal and a range/distance to the wireless device 105.

Figure 11:
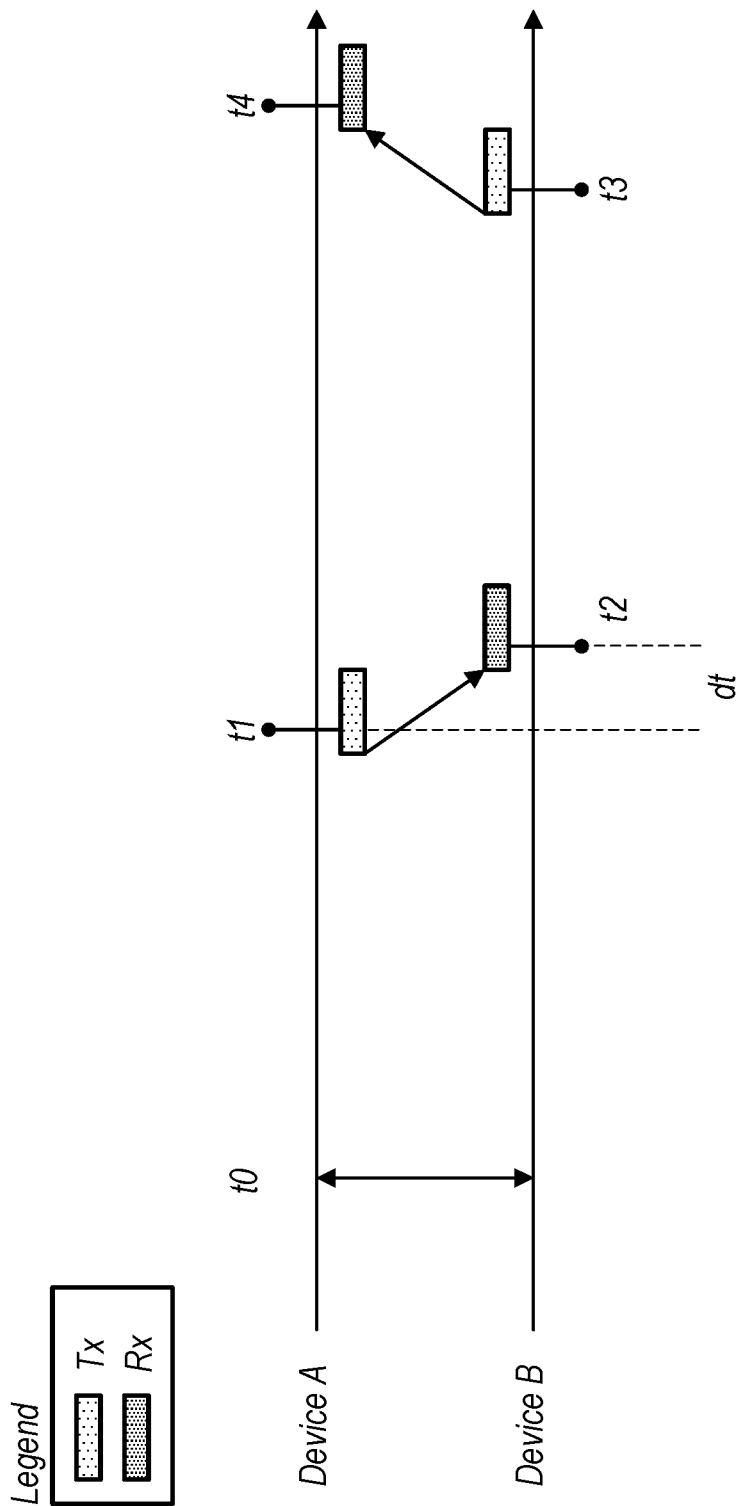
FIG. 11 is a communication flow diagram illustrating an exemplary sensing application, according to some embodiments.

FIG. 11—ToF Measurement

FIG. 11 is a communication flow diagram illustrating ToF, according to some embodiments. Two devices (Device A and Device B, which may correspond to wireless devices 103 and 105) may, at time t0, exchanges any number of messages to negotiate an ToF procedure. For example, one of the devices, e.g., an initiating STA (e.g., Device B) may send an initial measurement request to the other device (e.g., a responding STA, e.g., Device A). The initial measurement request may be or include an initial FTM request. The second device may respond (e.g., with an ACK). In the measurement request and response, the devices may negotiate various parameters of the ToF, including agreeing on a pre-coordinated seed for generating known sequences. It will be appreciated that although the negotiation phase is illustrated at a single time, t0, that multiple messages may be included and that the negotiation may take any amount of time.

At a second time, t1, Device A may transmit a measurement signal (e.g., an FTM frame) which may include any number of known sequences to Device B.

At a third time, t2, Device B may receive the measurement signal. Device B may perform a channel estimate (e.g., a combined channel estimate using multiple known sequences and multiple corresponding received sequences from the measurement signal). At the time of the first significant peak of the channel estimate, Device B may determine time interval dt, e.g., the one-way ToF between the transmission of the known sequences by Device A and the reception of the corresponding received sequences by Device B. Device B may calculate a range based on this time interval.

At a fourth time, t3, Device B may transmit a second measurement signal (e.g., an FTM frame) which may include any number of known sequences to Device A. The known sequences of the second measurement signal may be different than the known sequences of the first measurement signal.

At a fifth time, t4, Device A may receive the second measurement signal. Device A may perform a channel estimate (e.g., a second combined channel estimate using multiple known sequences and multiple corresponding received sequences from the second measurement signal). At the time of the first significant peak of the second channel estimate, Device A may determine a time interval e.g., the one-way ToF between the transmission of the known sequences by Device B and the reception of the corresponding received sequences by Device A. Device A may further determine the round-trip ToF based on the time between t1 and t4 (e.g., the first significant peak of the second channel estimate). Device A may calculate a range based on the one-way and/or round-trip time intervals.

It will be appreciated that determining a range/distance between the devices A and B is distinct from determining a communicative range of either of the devices. For example, if one of the devices A and B, it may have a communicative range of a first distance (e.g., x meters), however the range/distance between the two devices may be a second, different distance (e.g., y meters). The ToF measurement may be useful to determine the distance between the two devices (e.g., y meters).

Additional Information and Examples

In some embodiments, an improved channel estimate, and thus an improved sensing measurement may be achieved based on the techniques of FIG. 9. The following discussion provides further information about some embodiments.

Referring to FIG. 10, a signal (e.g., a sensing process signal) may pass through the cascade channel (e.g., the wireless channel) and the AFE (e.g., from A to D). However, the noise may only pass through the AFE (e.g., from C to D). Therefore, the wireless device 103 may perform a two-phase channel estimation. In a first phase, the wireless device 103 may estimate the cascade of the channel and AFE (e.g., from A to D). This estimate may be performed by the training sequences and/or data included in the sensing signal. In a second phase, the wireless device 103 may deduce the AFE gain response (e.g., from B to D) by estimating the noise spectrum, e.g., because the AFE may color the noise. The wireless device 103 may use the AFE gain response to determine an improved channel estimate, corrected for the AFE gain response. The wireless device 103 may use time or frequency domain averaging to achieve a desired level of processing gain. The improved channel estimate may be used for a sensing measurement, e.g., to estimate time of arrival of a signal and thus ToF.

In some embodiments, the wireless device 103 may determine a spectral composition of the noise detected, e.g., by modem 1006. The noise may not by entirely AWGN, e.g., it may have some non-random characteristics, e.g., a distinct spectral composition. The difference between the noise detected by the modem 1006 and pure AWGN may be due to the AFE response. Accordingly, the wireless device 103 may use the difference between the detected noise and pure AWGN to calculate the AFE response. The calculated AFE response may be used to correct the overall channel estimate to compensate for the AFE response. In turn, the corrected channel estimate may be used to determine a ToF or other sensing measurement.

For example, consider an estimate of variance of noise that includes a higher variance at the higher frequencies of the channel bandwidth. This estimate of the noise variance may suggest that the AFE gain response is more significant in the higher frequencies than in other frequencies of the channel bandwidth. Accordingly, the wireless device 103 may estimate the absolute value of the AFE gain response, e.g., according to Equation 4, to be relatively large at the high frequencies and relatively small (or zero) at the lower frequencies. Accordingly, the overall channel estimate may be corrected by reducing the gain at the higher frequencies, e.g., relative to the lower frequencies.

In some embodiments, a wireless device 103 may estimate the absolute value of g, e.g., the AFE gain response prior to a ranging transaction. In other words, the wireless device 103 may estimate noise characteristics (908) and estimate the AFE response (910) prior to receiving the sensing process signal (904) and potentially prior to negotiating sensing process parameters with a second wireless device 105. During the ranging transaction, the wireless device 103 may estimate the overall channel (hg) (906). The wireless device 103 may divide the estimated channel (hg) by the absolute value of the AFE gain response (g) in the frequency domain. (Note that in some embodiments, time domain division may be used). In other words, the wireless device 103 may perform de-embedding or deconvolution of the estimated absolute value of g from the estimate of hg. For example, Equation 4 may be used to estimate the absolute value of g, which may be substituted into the Equation 2 to solve for the estimated channel (h), corrected for AFE gain. The estimated channel (h) corrected for the AFE gain response (e.g., with g de-embedded) may be used for estimating ToF or for other sensing measurements.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for managing a first wireless device, the apparatus comprising a processor configured to cause the first wireless device to:
   begin a ranging process with a second wireless device;
   receive a ranging process signal from the second device over a channel;
   estimate noise characteristics on the channel;
   estimate, based on the noise characteristics, an analog front end (AFE) response;
   estimate, based on the AFE response and the ranging process signal, a channel estimate net of the AFE response;
   determine, based on the channel estimate net of the AFE response, a time of flight; and
   determine, based on the time of flight, a distance between the first wireless device and the second wireless device.

2. The apparatus of claim 1, wherein the noise characteristics include a spectrum of the noise.

3. The apparatus of claim 1, wherein beginning the ranging process includes negotiating a number of channel estimation sequences to include in the ranging process signal.

4. The apparatus of claim 3, wherein the number of channel estimation sequences is selected to provide a desired level of processing gain.

5. The apparatus of claim 1, wherein the noise characteristics include a variance of the noise, wherein to determine the AFE response includes:
   estimating a concatenation of the variance of the noise and the absolute value of the AFE response;
   dividing the concatenation by the variance of the noise; and
   taking the square root of the result of said dividing.

6. The apparatus of claim 1, wherein the apparatus is further configured to cause the first wireless device to periodically estimate the noise characteristics, wherein a most current estimate of the noise characteristics is used to estimate the AFE response.

7. The apparatus of claim 1, wherein the ranging process signal is a wireless local area network transmission.

8. A first wireless device, comprising:
   at least one antenna coupled to an analog front end (AFE); and
   a processor coupled to the AFE and configured to cause the first wireless device to:
   negotiate sensing parameters with a second wireless device;
   receive, from the second wireless device and using the at least one antenna, a signal including a number of training sequences according to the sensing parameters;
   perform, based on the signal, a channel estimation including:
      estimating a channel including the AFE;
      deducing a gain response of the AFE by estimating a noise characteristic; and
      determining, based on the channel including the AFE and the gain response of the AFE, a channel estimate corrected for the gain response of the AFE; and
   determining, based on the channel estimation, a time of arrival of the signal.

9. The first wireless device of claim 8, wherein deducing the gain response includes:
   subtracting the channel including the AFE from received samples of the signal normalized by a corresponding known sample.

10. The first wireless device of claim 9, wherein the result of the subtraction is averaged over the number of training sequences.

11. The first wireless device of claim 8, wherein determining the channel estimate corrected for the gain response of the AFE includes equalizing a channel response over a bandwidth of the channel.

12. The first wireless device of claim 11, wherein the bandwidth of the channel is 2-4 Ghz.

13. The first wireless device of claim 8, wherein performing the channel estimation further includes:
   performing a coherent summation of the number of training sequences.

14. The first wireless device of claim 8, wherein the number of training sequences is selected to provide a desired level of improvement of the channel estimate.

15. The first wireless device of claim 8, wherein the AFE includes at least one of:
   a filter;
   a phase shifter; or
   an amplifier.

16. The first wireless device of claim 8, wherein the AFE includes circuitry not configured for loopback.

17. A method for performing a ranging measurement, the method comprising:
   at a first wireless device:
      negotiating ranging parameters with a second wireless device;
      receiving a ranging signal from the second wireless device according to the ranging parameters;
      determining an overall channel estimate based on the ranging signal;
      determining a spectral composition of noise detected at a modem of the first wireless device;
      determining, based on the spectral composition, a correction to the overall channel estimate;
      determining, based on the correction, a time of flight of the ranging signal; and
      determining, based on the time of flight, a range from the first wireless device to the second wireless device.

18. The method of claim 17, wherein the correction corresponds to a front end gain of the first wireless device.

19. The method of claim 17, wherein the overall channel estimate is a data aided channel estimate.

20. The method of claim 17, wherein the spectral composition of the noise is distinct from additive white Gaussian noise.

* * * * *